(12) United States Patent  (10) Patent No.: US 7,877,809 B1
Sutton et al.  (45) Date of Patent: Jan. 25, 2011

(54) SECURE AUTOMATABLE CLEAN BOOT SYSTEM

(75) Inventors: Richard B. Sutton, Seal Beach, CA (US); Pieter Viljoen, Marina Del Rey, CA (US)

(73) Assignee: Symantec Corporation, Mountain View, CA (US)

( * ) Notice: Subject to any disclaimer, the term of this patent is extended or adjusted under 35 U.S.C. 154(b) by 988 days.

(21) Appl. No.: 11/409,414

(22) Filed: Apr. 20, 2006

(51) Int. Cl.
    *G06F 11/00* (2006.01)
(52) U.S. Cl. .............................. 726/24; 726/22; 713/188
(58) Field of Classification Search .................. 726/22, 726/23, 24, 25; 713/2, 188; 714/5
    See application file for complete search history.

(56) References Cited

U.S. PATENT DOCUMENTS

| | | | |
|---|---|---|---|
| 6,757,838 B1 * | 6/2004 | Chaiken et al. | 714/5 |
| 7,137,034 B2 * | 11/2006 | Largman et al. | 714/23 |
| 2007/0094654 A1 * | 4/2007 | Costea | 717/168 |

* cited by examiner

*Primary Examiner*—Kimyen Vu
*Assistant Examiner*—Baotran N To
(74) *Attorney, Agent, or Firm*—Fenwick & West LLP

(57) ABSTRACT

A computer system uses a clean boot technique to protect against malware attacks. Upon certain detection of a malware infection, the computer system is configured to clean boot off of a fixed secure volume containing its own operating system and security software. The security software in the fixed secure volume is usable to remediate the malware attack by itself or by relying at least in part on security software installed in the infected volume.

19 Claims, 8 Drawing Sheets

SECURE AUTOMATABLE CLEAN BOOT SYSTEM

BACKGROUND

As the Internet continues to expand in terms of both connectivity and number of users, the amount of malicious software ("malware") existing across the Internet continues to increase at a significant rate. Malware, in the form of, for example, viruses, spyware, and worms, is essentially software code written to infiltrate and/or damage a computer system. In some worst case scenarios, malware can destroy important data, render a computer system virtually useless, and/or bring down a network of hundreds or thousands of computer systems. Recovering a computer system or network from a successful malware attack often requires considerable resources. Further, malware, while typically attacking computer systems connected to the Internet, can also spread from one computer system to the other by, for example, a non-Internet based file transfer between computer systems.

Although malware authors have traditionally designed their malware to attack user-level applications (e.g., word processing applications, mail applications), newer forms of malware are being designed to attack more internal and core components of computer systems. Most significantly, a computer system's operating system (OS) can be targeted for malware attack(s). Those skilled in the art will note that the operating system is a special program responsible for managing the relationship between application software, the wide variety of hardware that makes up the computer system, and the user of the computer system. Should malware successfully attack the operating system, the entire computer system may be compromised.

The operating system is loaded via its kernel, which is a piece of software responsible for providing secure access to the machine's hardware and processes. The kernel itself is instantiated and loaded when the computer system is "booted up" after being powered 'on' or after a hard reset. Noting that the kernel plays an important role during the boot-up of a computer system, it is important to ensure that anti-malware programs (also referred to herein as "security software") (e.g., Norton Antivirus™ by Symantec Corporation) be able to combat kernel-targeting malware. In other words, measures must be taken to prevent malware from gaining control of the kernel, especially prior to any installation of security software in the operating system.

As security software for protecting kernels becomes more effective over time, malware authors will design their malware to attack at earlier points in the boot process. If malware successfully attacks a computer system during boot-up, the integrity of subsequent operations by the computer system is rendered suspect, perhaps without knowledge of the user. Thus, it is important to ensure that mechanisms be in place to guarantee a secure computing environment upon boot-up.

One solution to ensure entry into a secure environment upon boot-up involves booting from external, physical read-only media (e.g., a compact disc (CD), a digital video disc (DVD)). In general, the external read-only media has known safe boot and operating system code to ensure a non-infected computing environment into which security software can be loaded. However, using external read-only media in the manner described above presents usability issues. For example, typical consumer users cannot be expected to know when and how to reliably follow the external read-only media boot process. Further, the boot process requires that a user manually and locally interact with the computer system. This especially serves as a hardship to remotely located information technology (IT) administrators. Also, the use of external read-only media requires a management scheme to track and maintain a potentially large number of media. Moreover, the security software on such media needs to be regularly updated, thereby requiring the implementation of a potentially expensive update mechanism.

SUMMARY

According to at least one aspect of one or more embodiments of the present invention, a method of protecting a computer system against malware comprises: detecting a malware infection in a first storage device volume of the computer system; causing the computer system to boot from a second storage device volume of the computer system dependent on the detecting, where the second storage device volume is a fixed read-only volume; and remediating the malware infection using security software stored in the second storage device volume.

According to at least one other aspect of one or more embodiments of the present invention, a system for protecting a computer system against malware comprises: a first module usable to detect a malware infection; a second module usable to attempt to cause the computer system to boot from a fixed read-only storage medium on a next reboot dependent on the malware infection; and a third module usable to remediate the malware infection, where the first module and the second module are adapted to be stored on a read-write storage medium, and where the third module is adapted to be stored on the fixed read-only storage medium.

According to at least one other aspect of one or more embodiments of the present invention, a computer-readable medium has instructions to: (i) detect a malware infection in a first storage device volume of a computer system; (ii) cause the computer system to boot from a second storage device volume of the computer system based on the detection, where the second storage device volume is a fixed read-only volume; and (iii) remediate the malware infection using security software stored in the second storage device volume.

The features and advantages described herein are not all inclusive, and, in particular, many additional features and advantages will be apparent to those skilled in the art in view of the following description. Moreover, it should be noted that the language used herein has been principally selected for readability and instructional purposes and may not have been selected to circumscribe the present invention.

Each of the figures referenced above depict an embodiment of the present invention for purposes of illustration only. Those skilled in the art will readily recognize from the following description that one or more other embodiments of the structures, methods, and systems illustrated herein may be used without departing from the principles of the present invention.

DETAILED DESCRIPTION

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

In order for a computer system to successfully boot, its basic input/output system (BIOS) (i.e., generally, software stored in a read-only memory (ROM) that determines what the computer system can do without accessing programs from a hard disk), operating system, and hardware components must all load and work properly. When the computer system is first powered 'on' or after a hard reset, the system's central processing unit (CPU) is initialized and looks to the BIOS for executing a startup program. The startup program verifies hardware devices (e.g., video cards), secondary storage devices (e.g., hard drives, floppy drives), and other hardware devices (e.g., keyboard, mouse). Once the BIOS has determined that all components of the computer system are present and functioning properly, the BIOS looks to load an operating system. The order of drives searched for the operating system is referred to as the "boot sequence" and is modifiable through the BIOS.

Once the operating system has been found and initialized, the operating system essentially takes control of the boot process over from the BIOS. The operating system performs an inventory of the computer system's memory and memory availability and loads the device drivers that the operating system needs to control peripheral devices (e.g., printer, scanner, mouse, keyboard). Thereafter, the user can access the computer system's applications to perform tasks.

As described above, malware authors are designing their malware to attack at earlier and earlier points in the boot process. Accordingly, at least partly to prevent malware from successfully "hijacking" a computer system via its boot process, embodiments of the present invention generally relate to an automated "clean boot" that ensures that malware does not load on the computer system prior to security software being loaded to guard against or handle malware attacks. As used herein, "clean boot" refers to when a computer system boots from a known malware-uninfected device/component.

Figure 1:
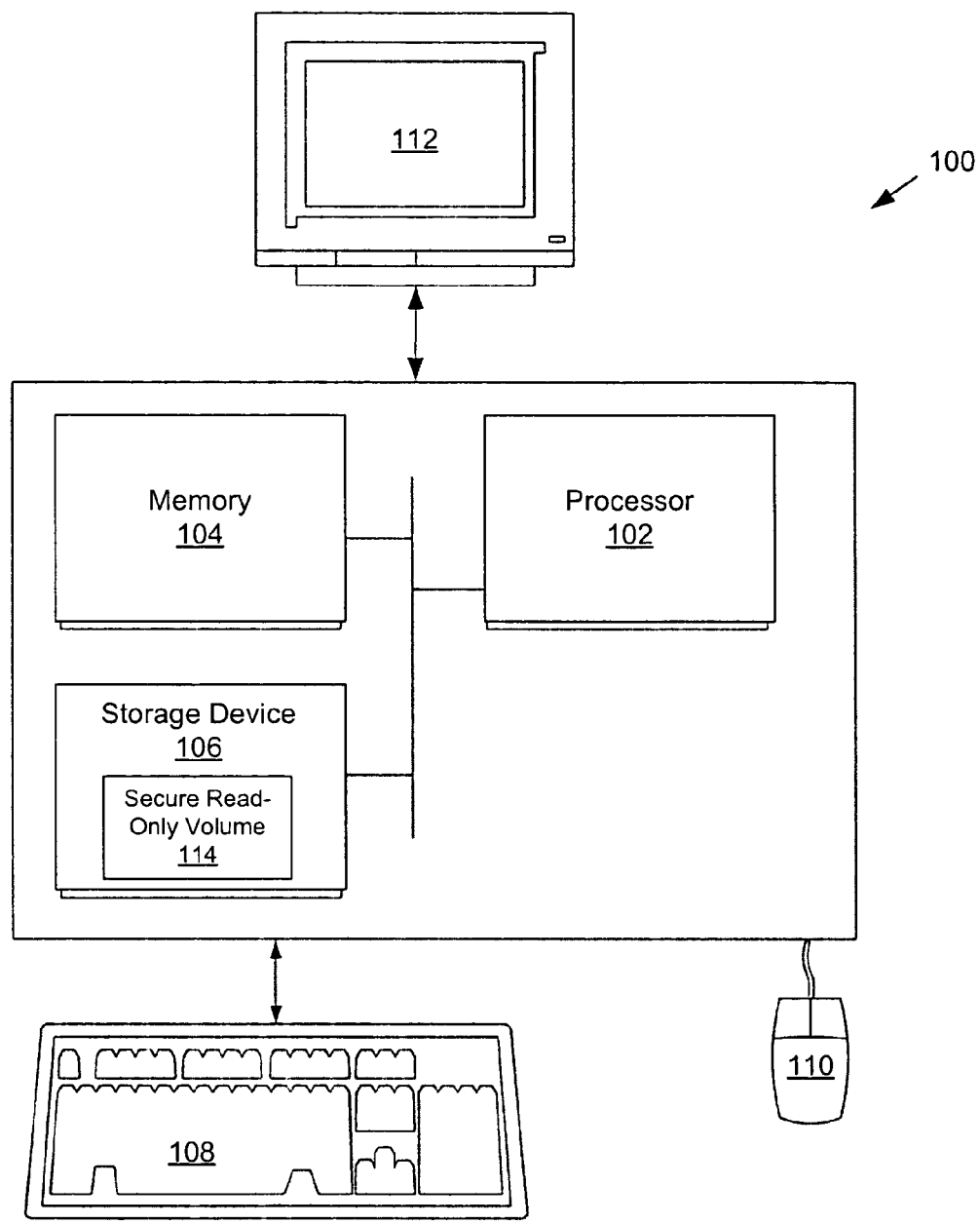
FIG. 1 shows a computer system in accordance with an embodiment of the present invention.

FIG. 1 shows a computer system 100 in accordance with an embodiment of the present invention. The computer system 100 may be any type of computer system, including multiprocessor and multithreaded uniprocessor systems, regardless of the platform being used. For example, the computer system 100 includes at least one processor (e.g., a general-purpose processor, a field-programmable gate array (FPGA), an application-specific integrated circuit (ASIC), a graphics processor) 102, associated memory 104, a storage device (e.g., a "hard drive") 106, and numerous other elements (not shown) and functionalities typical of modern computer systems. Further, the storage device 106 is provided with a secure read-only volume 114. As described in more detail below with reference to FIGS. 2-8, the secure read-only volume 114 is used for a clean boot, and security software installed in the secure read-only volume 114 ensures that the computing environment upon the clean boot is secure.

Still referring to FIG. 1, software modules/instructions to perform one or more embodiments of the present invention may be stored on a computer-readable medium such as a compact disc (CD), a diskette, a tape, a file, a hard drive, or any other computer-readable storage device. For example, software may be stored on the storage device 106, and more particularly, on the secure read-only volume 114. Further, in general, software may be pre-installed on the storage device 106 and/or loaded onto the storage device 106 either automatically by the computer system 100 or by user command.

Further, the computer system 100 may also include input means (e.g., a keyboard 108, a mouse 110) and output means (e.g., a monitor 112). Those skilled in the art will appreciate that these input and output means may take other forms.

Further, the computer system 100 may be connected to a local area network (LAN) or a wide area network (WAN) (e.g., the Internet) via a wired or wireless network interface connection (not shown). Those skilled in the art will additionally note that one or more elements of the computer system 100 may be remotely located and connected to the other elements over a network.

Figure 2:
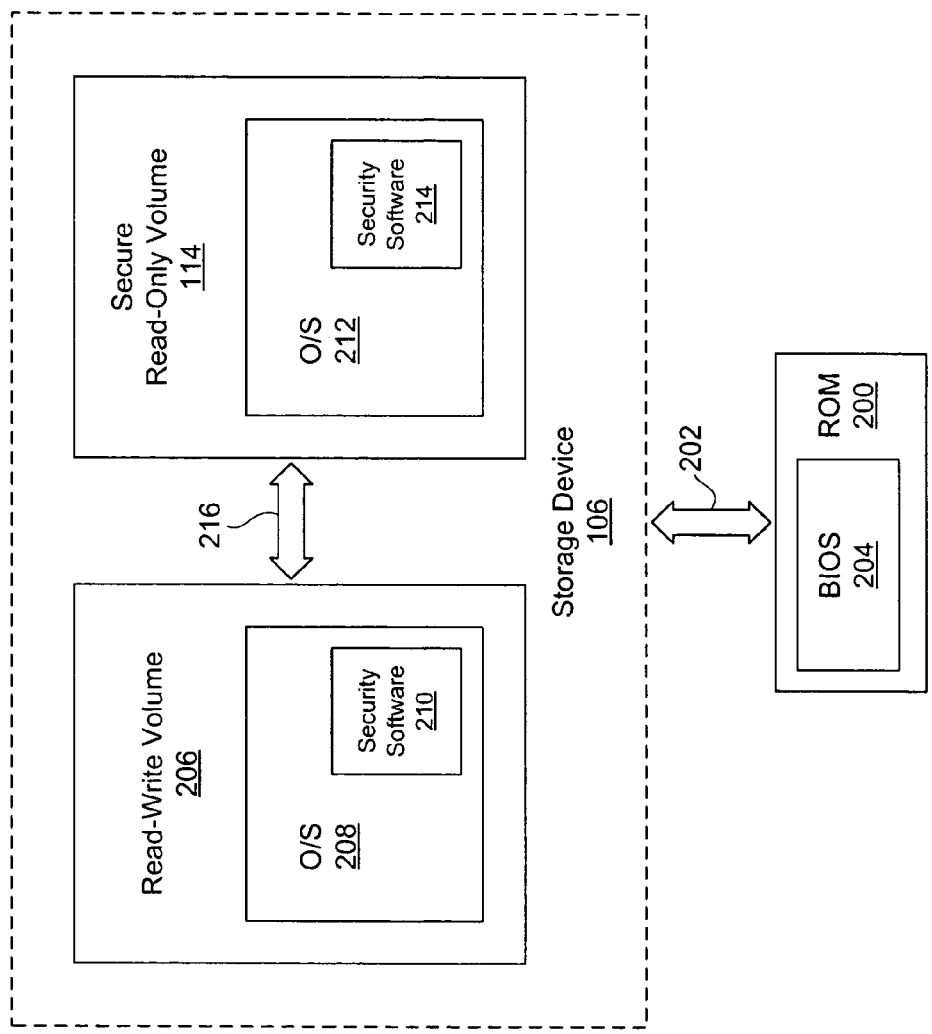
FIG. 2 shows a block diagram of a portion of a computer system in accordance with an embodiment of the present invention.

FIG. 2 shows a portion of a computer system 100 in accordance with an embodiment of the present invention. Particularly, FIG. 2 shows a read-only memory 200 (which, in one or more embodiments, may be part of memory 104 shown in FIG. 1) and the storage device 106.

The read-only memory 200 stores, possibly among other things, the BIOS 204 of the computer system 100. The BIOS 204 specifies the boot sequence for the computer system 100. In general, the BIOS 204 may be set to cause a clean boot on the next reboot in response to the detection of particular malware. The BIOS 204 can cause a clean boot in one or more of at least two ways. In some cases, a user and/or a computer system component may selectively modify the boot sequence of the BIOS 204 (as described below with reference to security software 210). Further, the BIOS 204 may be configured to clean boot every n reboots regardless of any actions by the user and/or other computer system components. Such a feature guarantees that a clean boot will occur at some time regardless of whether malware has compromised the ability of the user and/or computer system components to modify the BIOS 204. Further, while in some embodiments, such a forced clean boot feature may be based on the number of reboots, in one or more other embodiments, the BIOS 204 may be set to force clean boot based on other factors. For example, the BIOS 204 may be set to force a clean boot at certain times (e.g., once a week). Further, the predetermined basis upon which clean boots forcibly occur may be set by a user.

The storage device 106 is formed of the secure read-only volume 114 and at least one read-write volume 206. The storage device 106 itself may be a secondary storage device, such as a hard drive. In such embodiments, the volumes 114, 206 may exist as different partitions on the hard drive. Further, in one or more other embodiments, either or both of the volumes 114, 206 may be supported in primary storage, such as main memory. Still further, the location of the volumes 114, 206 may be preset by a vendor of the computer system 100 or a manufacturer of the storage device 106. Information regarding the presence and location of the volumes 114, 206 may be stored as part of the computer system's BIOS 204.

Further, in one or more embodiments, the secure read-only volume 114 may reside in specialized or custom hardware in the computer system 100. For example, the secure read-only volume 114 may be available as a "security card" that can be installed in the computer system 100. Further, in one or more embodiments, the secure read-only volume 114 may be installed in the computer system 100 as a special security read-only memory.

Further, the secure read-only volume 114 may be instantiated on a "trusted computing" platform. In such cases, data on the secure read-only volume 114 could be protected by keys stored in dedicated hardware (e.g., a special-purpose processor).

Further, those skilled in the art will note that although the storage device 106 is shown as having only two volumes, in one or more other embodiments, a different number of volumes may exist, as long as there is at least one secure read-only volume for clean booting as described below with reference to FIGS. 3 and 5.

Still referring to FIG. 2, the read-write volume 206 stores the "main" operating system 208 of the computer system 100. In other words, operating system 208 is the intended operating system to be used for regular day-to-day operations. The operating system 208 may be one of various known types of operating systems (e.g., Windows® by Microsoft Corporation, MacOS® by Apple Computer, Inc.).

To guard against malware, security software 210 on the read-write volume 206 is executable by operating system 208. In general, when security software 210 detects malware that is known to require a clean boot for remediation, security software 210 adjusts the boot sequence setting of the BIOS 204 to specify the secure read-only volume 114 as the primary boot device (i.e., a boot device ahead of the read-write volume 206 in the designated boot sequence). Thus, on the next reboot, the computer system 100 clean boots from the secure read-only volume 114. Further, those skilled in the art will note that as described above, should a path (e.g., a software interface) between security software 210 and the BIOS 204 be compromised by malware, the BIOS 204 is configured to clean boot at some point in the future regardless of the ability of security software 210 to access/modify the BIOS 204.

Figure 3:
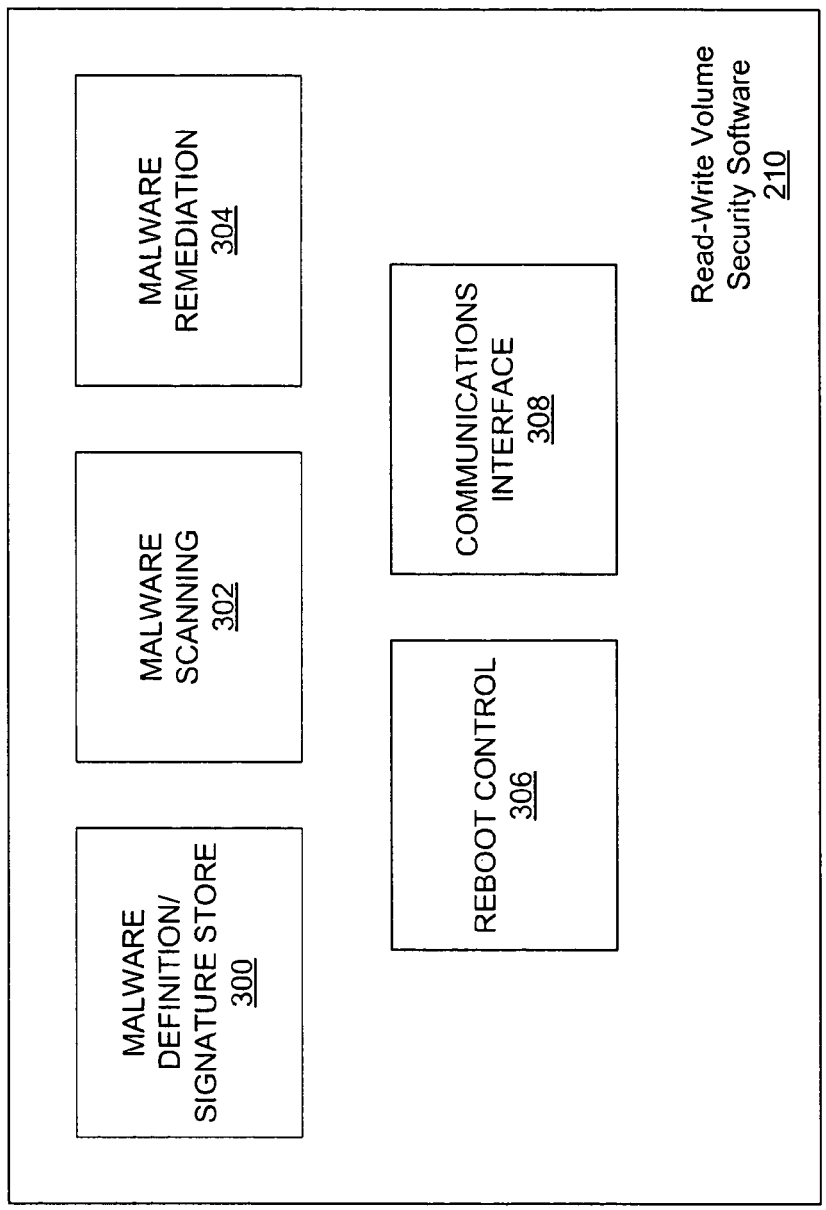
FIG. 3 shows a component diagram of security software in accordance with an embodiment of the present invention.

FIG. 3 shows a component diagram of security software 210 in accordance with an embodiment of the present invention. Security software 210 includes or is otherwise associated with a malware definition/signature store 300, a malware scanning module 302, and a malware remediation module 304. Those skilled in the art will note that a "module" refers to any program logic or functionality implemented in software and/or hardware.

The malware definition/signature store 300 is arranged to keep an up-to-date database of the characteristics of known malware. The malware definition/signature store 300 may be updated automatically at fixed intervals, upon detection of newly available malware definitions or signatures, or upon user command.

Based on the information contained in the malware definition/signature store 300, the malware scanning module 302 is configured to scan the read-write volume 206 and/or other components (e.g., memory, registries, floppy drives, network drives) of the computer system 100. For example, the malware scanning module 302 may scan the read-write volume 206 based on signature scanning and/or heuristics analysis. Those skilled in the art will note that the malware scanning module 302 may be used to perform one or more of various types of scanning.

The scanning by the malware scanning module 302 may result in the detection of malware running/residing on the computer system 100. The detected malware is then handled by the malware remediation module 304. The malware remediation module 304 may handle the detected malware in one or more various ways. For example, the malware remediation module 304 may simply quarantine the detected malware so as to isolate the detected malware from running processes. Moreover, the malware remediation module 304 may clean the detected malware by altogether deleting the detected malware from the computer system 100. Still further, the malware remediation module 304 may be caused to ignore the detected malware upon user command.

Security software 210 also includes a reboot control module 306. In general, the reboot control module 306 reboots the computer system 100 upon detection of certain types of malware by the malware scanning module 302. In other words, the reboot control module 306 is arranged to effectively place the computer system 100 in a known good state. For example, based on information stored in the malware definition/signature store 300, the malware scanning module 302 may detect a form of malware that is known to require a clean boot to remediate. Alternatively, the malware scanning module 302 could detect a form of malware that the malware remediation 304 does not know how to remediate. In either case, the reboot control module 306 may then initiate a clean boot of the computer system 100 in an effort to effectively remediate the detected malware.

In other words regarding the role of the reboot control module 306, certain malware may be known to attack a computer system early in its boot process. Should these types of malware be detected during operation of the computer system 100, this indicates a likelihood that the computer system 100 is operating in a compromised state. Thus, in such a case, upon detection of the malware, the reboot control module 306 forces or otherwise causes the computer system 100 to clean boot. In one or more embodiments, to cause a clean boot, the reboot control module 306 may modify a boot sequence setting of the BIOS 204, effectively resulting in the BIOS 204 booting from secure read-only volume 114 (instead of the read-write volume 206) on reboot.

Security software 210 may also include a communications interface module 308. The communications interface module 308 allows security software 210 to communicate with other components, both hardware and software. For example, the communications interface module 308 may support communications between security software 210 and other portions of operating system 208. Further, the communications interface module 308 may support communications between security software 210 and the BIOS 204. Further still, the communications interface module 308 may support communications between security software 210 and the secure read-only volume 114.

The communications interface module 308 may be implemented in one or more of various ways. For example, in one or more embodiments, the communications interface module 308 may be implemented as a software interface over which one component makes function and data calls to another component. Further, in one or more embodiments, the communications interface module 308 may facilitate communications over a dedicated signal or signal wire between two or more components.

Further, the integrity of some or all of security software 210 (including, for example, modules 300, 302, 304, 306, 308) may be guaranteed through the use of digital signatures. Those skilled in the art will note that such digital signatures ensure that particular modules or all of security software 210 has not been infected by malware or otherwise tampered with.

Now referring again to FIG. 2, the secure read-only volume 114 is said to be "secure" because it is a read-only storage medium. In other words, it is hardware protected against being written to. Further, the secure read-only volume 114 is "fixed" in that it is not an external storage medium, such as a CD or DVD. Instead, the secure read-only volume 114 is effectively installed in the computer system 100.

Further, although volume 114 is referred to herein as "secure read-only," under certain conditions and settings, the secure read-only volume may be written to. In some cases, the secure read-only volume 114 may be accessible for configuration via a hardware attribute of the secure read-only volume 114. For example, the secure read-only volume 114 and/or the use thereof may be modifiable by adjusting one or more cables operatively connecting the secure read-only volume 114 (or the storage device 106 in general) to a "motherboard" on which, for example, the read-only memory 200 containing the BIOS 204 resides. Further, in one or more embodiments, the secure read-only volume 114 may be accessed via dip switches, user-accessible buttons, and hardware and/or software keys. In the case of user-accessible buttons, for example, the secure read-only volume 114 may be written to while the user is holding down a particular button.

Further, the secure read-only volume 114 stores an operating system 212. Operating system 212 has at least enough functionality to boot the computer system 100, cause the remediation of one or more forms of malware, and toggle the BIOS 204 to reboot off of the read-write volume 206. However, in one or more embodiments, operating system 212 may be complete, or substantially complete, in that the computer system 100 can be effectively used by a user while operating system 212 is running.

Figure 4:
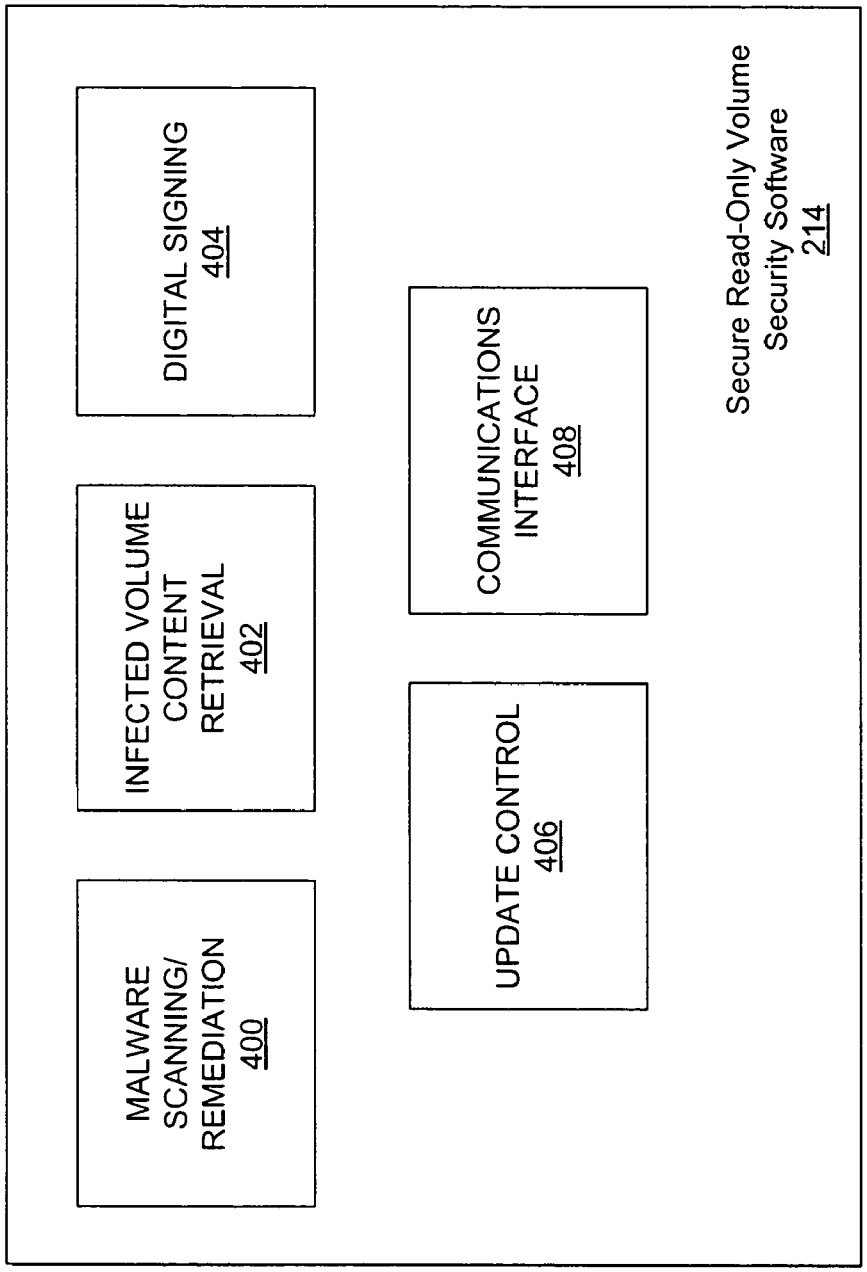
FIG. 4 shows a component diagram of security software in accordance with an embodiment of the present invention.

Further, security software 214 on the secure read-only volume 114 is executable by operating system 212. FIG. 4 shows a component diagram of security software 214 in accordance with an embodiment of the present invention. Security software 214 contains a malware scanning/remediation module 400. The functionality of the malware scanning/remediation module 400 may be similar to that described above with reference to the modules 302, 304 shown in FIG. 3. However, in one or more embodiments, the functionality of the malware scanning/remediation module 400 may be limited relative to the modules 302, 304 shown in FIG. 3. Moreover, although not shown in FIG. 4, security software 214 may include or otherwise be associated with a malware definition/signature store similar to module 300 shown in FIG. 3.

Security software 214 may also include an infected volume content retrieval module 402. If, for example, (i) security software 210 determines that the read-write volume 206 is infected, and (ii) the computer system 100 has been caused to clean boot off of the secure read-only volume 114, the infected volume content retrieval module 402 may retrieve the content required to clean the infection (e.g., virus definitions, updateable engines) from the read-write volume 206.

The integrity of the content retrieved from the read-write volume 206 may be verified by a content verification module 404. In general, upon clean boot, the content verification module 404 (of security software 214) verifies the digital signatures of security software 210. By verifying the digital signatures of security software 210 using the content verification module 404, security software 214 ensures that particular modules or all of security software 210 has not been infected by malware or otherwise tampered with.

Further, security software 214 may also have an update control module 406. The update control module 406 is used to ensure that security software 214 is up-to-date. As described in more detail below with reference to FIGS. 7 and 8, the update control module 406 may update security software 214 directly from the secure read-only volume 114 and/or via the read-write volume 206 (even though infected). Further, in one or more embodiments, the digital signing module 404 may be used to verify new software updates retrieved from the read-write volume 206.

Security software 214 may also include a communications interface module 408. The communications interface module 408 allows security software 214 to communicate with other components, both hardware and software. However, in order to prevent communications interfaces from serving as an attack surface for malware, the communications interface module 408 may only communicate if it can verify the security of the overall communication interface. Further, the communications interface module 408 may support communications between security software 214 and other portions of operating system 212. Further, the communications interface module 408 may support communications between security software 214 and the BIOS 204. Further still, the communications interface module 408 may support communications over a secure communication channel 216 between security software 214 and the read-write volume 206.

The communications interface module 408 may be implemented in one or more of various ways. For example, in one or more embodiments, the communications interface module 408 may be implemented as a software interface over which one component makes function and data calls to another component. Further, in one or more embodiments, the communications interface module 408 may facilitate communications over a dedicated signal or signal wire between two or more components.

Further, in one or more embodiments, security software 214 may have a BIOS validation module (not shown). The BIOS validation module may verify the integrity of the BIOS 204 in view of possible exposure to BIOS-targeting malware. Should the BIOS validation module detect that the BIOS has been compromised, the BIOS validation module may cause the computer system 100 to reboot using an "unmodifiable" BIOS configuration to which an external software interface (for potential malware access) does not exist or is otherwise strongly restricted.

While the description above with reference to FIGS. 1-4 describes the structure and functionality of one or more embodiments of the present invention, description is now provided of various processes in accordance with embodiments of the present invention.

Clean Booting

Figure 5:
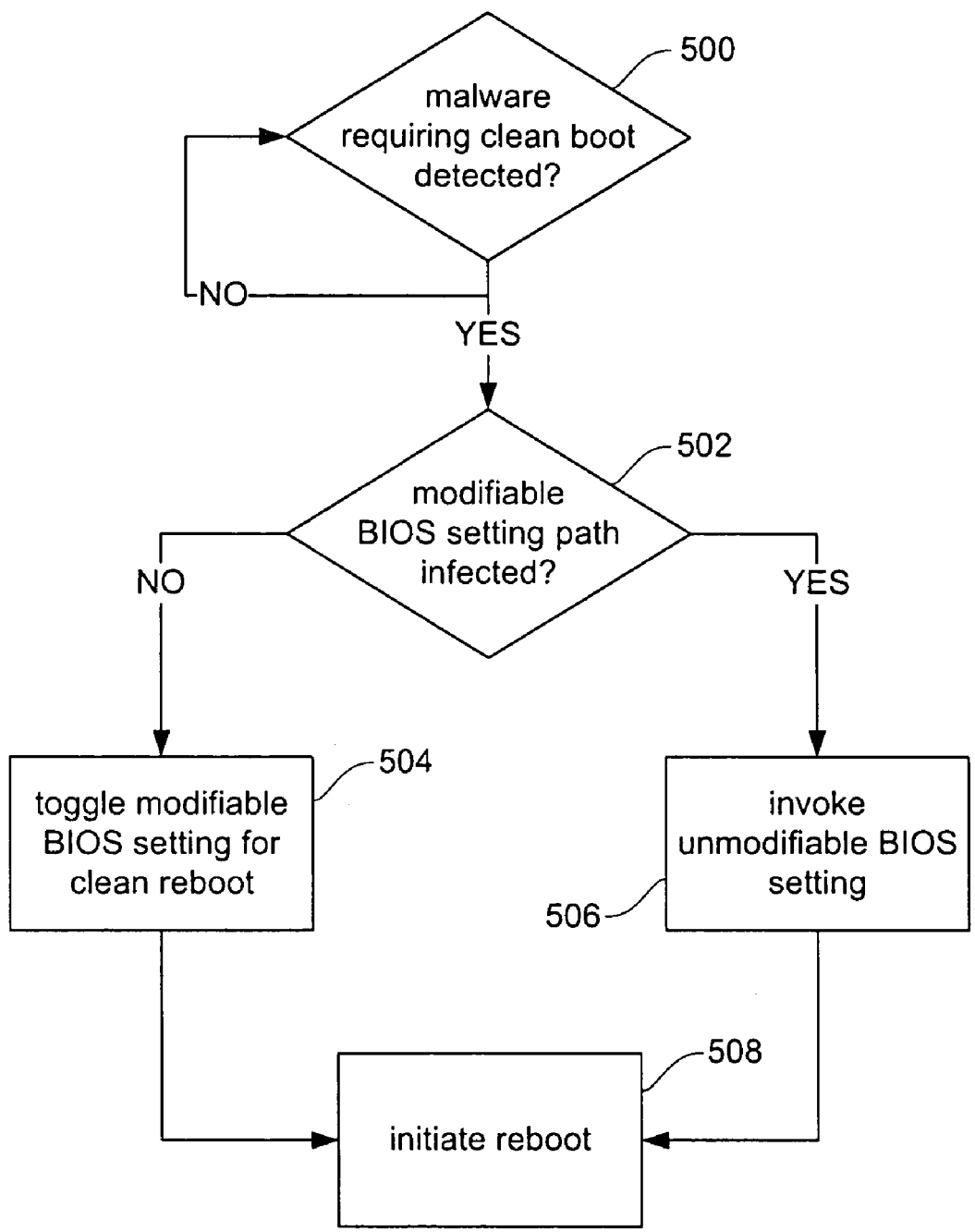
FIG. 5 shows a flow process in accordance with an embodiment of the present invention.

FIG. 5 shows a flow process of clean booting the computer system 100 in accordance with an embodiment of the present invention. While the computer system 100 is running off of operating system 208, security software 210 periodically or upon user command scans for malware. If, in ST500, security software 210 detects malware that requires a clean boot to remediate, the security software 210 attempts to modify the BIOS boot sequence for clean boot on the next reboot ST502, ST504. However, if in ST502, security software 210 detects that its path to the BIOS is infected, the BIOS boot sequence cannot therefore be reliably accessed/modified by security software 210. Instead, the computer system 100 forcibly modifies the BIOS boot sequence every n reboots ST506, ST504. Once the BIOS boot sequence setting has been modified for clean boot either (i) selectively by security software 210 via ST502 and ST504 or (ii) on some fixed basis via ST502, ST506, and ST504, the computer system 100 will then clean boot on the next reboot ST508.

Remediating Malware in the Clean Boot ("Secure") Environment

Figure 6:
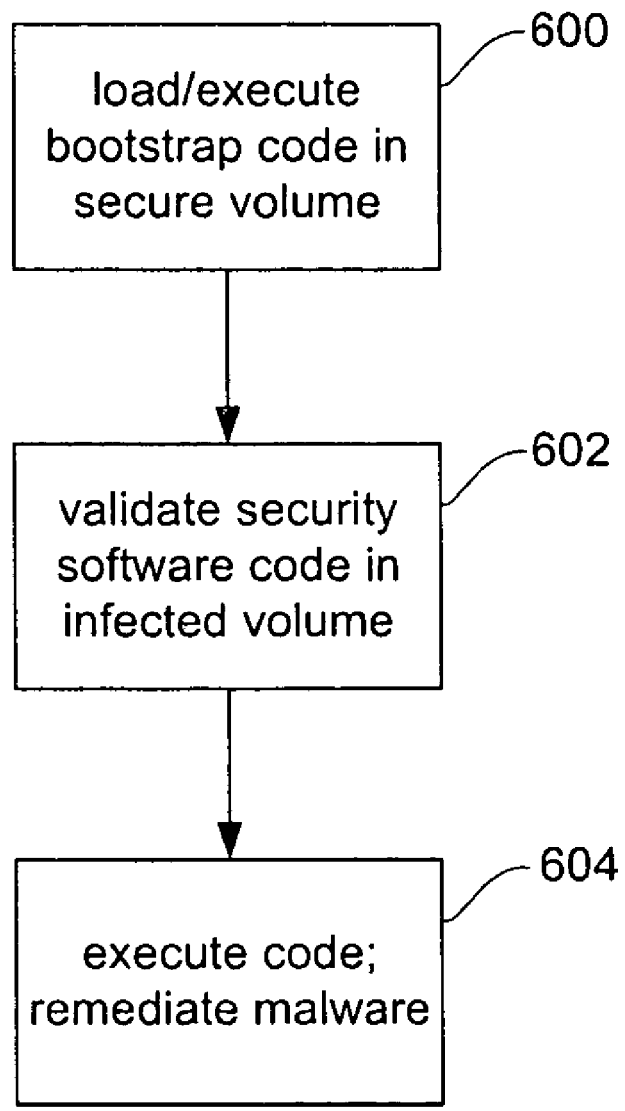
FIG. 6 shows a flow process in accordance with an embodiment of the present invention.

FIG. 6 shows a flow process of one way to remediate malware once in the clean boot environment. Particularly, FIG. 6 shows a way to remediate malware in the clean boot environment using security software 210 of the read-write volume 206. During the clean boot, some unmodifiable bootstrap code in the secure read-only volume 114 is loaded and executed ST600. This bootstrap code may itself not contain the code needed to remediate malware. However, in ST602, the execution of the bootstrap code causes security software 214 of the secure read-only volume 114 to validate particular code in security software 210 of the read-write volume 206. Such validation may be performed by the content verification module 404 of security software 214. Once security software 210 is validated by security software 214, security software 210 is executed ST604. Because security software 210 is likely already up-to-date due to its immediately prior and frequent use when the computer system 100 was/is running off of the read-write volume 206, the execution of security software 210 in ST604 results in the scanning and remediation of malware, including the targeted malware infection (i.e., the malware infection that effectively caused the computer system 100 to clean boot).

Updating Security Software on the Secure Read-Only Volume

In addition to or instead of malware being remediated by security software 210 of the read-write volume 206 as described above with reference to FIG. 6, malware may be scanned and remediated based on functionality provided in security software 214 of the secure read-only volume 114. Noting that security software 214 may not be frequently exercised due to limited clean boot occurrences, it is important to ensure that security software 214 is up-to-date upon any clean boot.

As described above, under certain conditions and settings, the security read-only volume 114 may be written to. Accordingly, in order to update security software 214, the secure read-only volume 114 may be arranged to allow itself (or via other means) to be written to. Further, for example, such "write-to" access may be limited to one or more particular components of security software 214 (e.g., a malware signature/definition store).

Figure 7:
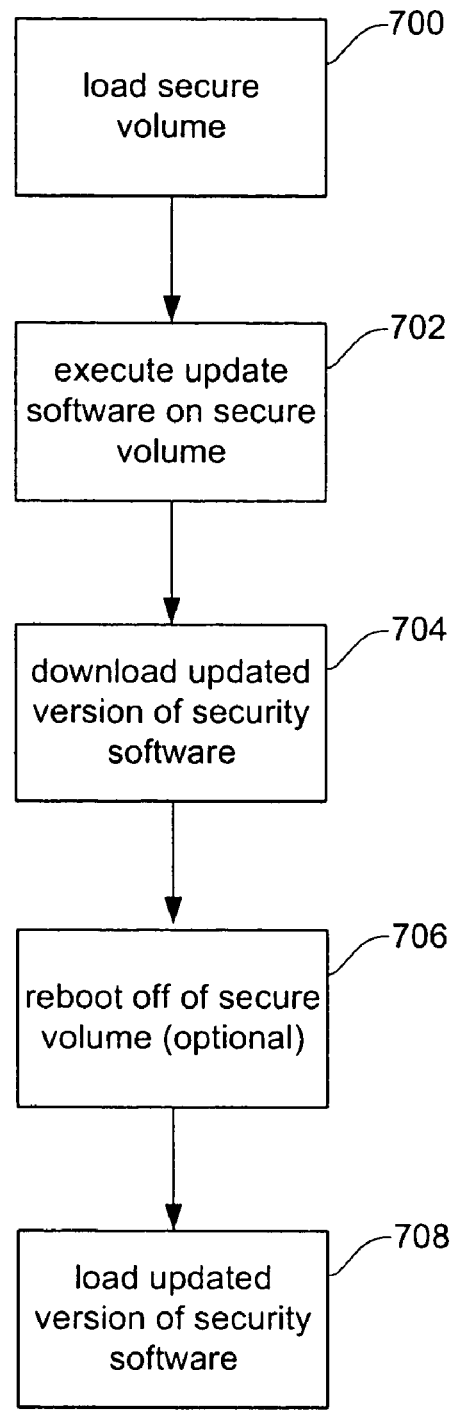
FIG. 7 shows a flow process in accordance with an embodiment of the present invention.

In one or more embodiments, security software 214 is updateable off of the secure read-only volume 114 (i.e., security software 214 is updateable independent of an interface to the read-write volume 206). FIG. 7 shows such a process. Once the secure read-only volume 114 is loaded ST700, security software 214 executes an update function ST702. In response to executing the update function in ST702, an updated version of security software 214 is downloaded (from, for example, an Internet web site managed by the provider/vendor of security software 214) ST704. Once the updated version of security software 214 is downloaded in ST704, the computer system 100 may optionally be rebooted from the secure read-only volume 114 ST706. Upon this clean boot, the updated version of security software 214 is loaded ST708. Alternatively, in one or more embodiments, security software 214 may update itself from the network without requiring a reboot. Then, after updating security software 214 with or without a reboot, security software 214 may be effectively used for malware scanning and remediation.

Figure 8:
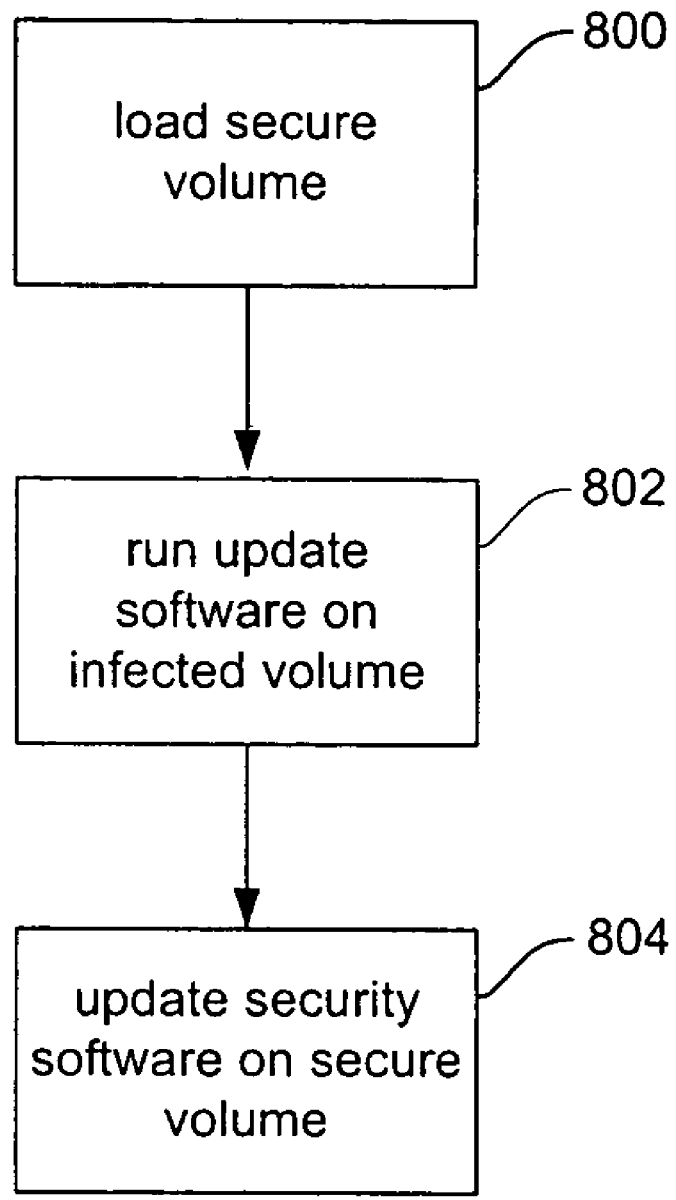
FIG. 8 shows a flow process in accordance with an embodiment of the present invention.

Further, in one or more embodiments, security software 214 may be updated via security software 210 of the read-write volume 206. FIG. 8 shows such a process. Initially, at clean boot, the secure read-only volume 114 is loaded ST800. Then, bootstrap code on the secure read-only volume 114 or security software 214 causes the execution of a security software update function in the read-write volume 206 ST802. This results in an update of security software 210 via, for example, the Internet. In ST804, functionality in the read-write volume 206 uses, for example, communication channel 216, to update security software 214 of the secure read-only volume 114. Thereafter, the computer system 100 may be rebooted with security software 214 already updated.

Advantages of the present invention may include one or more of the following. In one or more embodiments, an automated clean boot system may be used for effective malware scanning and remediation.

Further, in one or more embodiments, a computer system may be booted off of a hardware-protected secure volume containing its own security software, thereby eliminating or otherwise minimizing the vulnerability of the computer system from being taken over by malware during a boot sequence.

Further, in one or more embodiments, a computer system caused to clean boot may be ensured to be in a secure environment based on security software hardware-protected on the boot device used for the clean boot.

While the invention has been described with respect to a limited number of embodiments, those skilled in the art, having benefit of the above description, will appreciate that other embodiments may be devised which do not depart from the scope of the present invention as described herein. Accordingly, the scope of the present invention should be limited only by the appended claims.

What is claimed is:

1. A computer-implemented method of protecting a computer system against malware, comprising:
   using a processor to perform method steps comprising:
      detecting a malware infection in a first storage device volume of the computer system, wherein the malware causing the malware infection is a form of malware known to require a clean boot of the computer system for remediation of the malware;
      responsive to the detection of the malware infection, a security module of the computer system automatically modifying a basic input/output system (BIOS) boot sequence of the computer system to designate a second storage device volume to be a primary boot device for the computer system, causing the computer system to automatically boot from the second storage device volume of the computer system at a next reboot of the computer system;
      executing update software stored in the first storage device volume;
      updating, by execution of the update software, security software stored in the second storage device volume, the second storage device volume being a fixed read-only volume; and
      remediating the malware infection using the updated security software stored in the second storage device volume.

2. The method of claim 1, further comprising:
   causing the computer system to boot from the second storage device volume after a predetermined number of boots from the first storage device volume.

3. The method of claim 1, further comprising:
   causing the computer system to boot from the second storage device volume after a pre-determined time interval has elapsed since a previous boot from the second storage device volume.

4. The method of claim 1, wherein the first storage device volume comprises a read-write volume.

5. The method of claim 1, wherein the remediating comprises:

loading bootstrap code on the second storage device volume;

validating security software stored in the first storage device volume; and executing the security software stored in the first storage device volume to remediate the malware infection.

6. The method of claim 5, the validating comprising:

verifying digital signatures of the security software stored in the first storage device volume.

7. The method of claim 1, the further comprising:

executing update software stored in the second storage device volume;

loading an updated version of the security software stored in the second storage device volume in response to the executing; and using the updated version to remediate the malware infection.

8. The method of claim 1, further comprising:

detecting that the BIOS has been compromised; and responsive to the detection of the compromised BIOS, causing the computer system to boot using an unmodifiable BIOS to which malware does not have access.

9. A computer-implemented system for protecting a computer system against malware, comprising:

a computer-readable storage medium storing executable software modules comprising:

a first module usable to detect a malware infection, the first module adapted to be stored on a read-write storage medium of the computer system, wherein the malware causing the malware infection is a form of malware known to require a clean boot of the computer system for remediation of the malware;

a second module usable to automatically modify a basic input/output system (BIOS) boot sequence of the computer system to designate a fixed read-only storage medium to be a primary boot device for the computer system, causing the computer system to automatically boot from the fixed read-only storage medium at a next reboot of the computer system in response to the detection of the malware infection, the second module adapted to be stored on the read-write storage medium;

a third module usable to execute update software for updating a security software stored in the read-only storage medium, the update software stored in the read-write storage medium;

a fourth module usable to remediate the malware infection using the updated security software stored in the read-only storage medium, the fourth module being stored on the fixed read-only storage medium; and a processor configured to execute the software modules stored by the computer readable storage medium.

10. The system of claim 9, wherein the computer system is configured to boot from the fixed read-only storage medium after a predetermined number of boots from the read-write storage medium.

11. The system of claim 9, further comprising:

a fifth module usable to remediate the malware infection, the fifth module adapted to be stored on the read-write storage medium.

12. The system of claim 11, further comprising:

a sixth module usable to update the fifth module, the sixth module adapted to be stored on the read-write storage medium.

13. The system of claim 9, further comprising:

a fifth usable to update the fourth module, the fifth module adapted to be stored on the fixed read-only storage medium.

14. The system of claim 9, further comprising:

a fifth module usable to verify at least part of security software stored on the read-write storage medium, the fifth module adapted to be stored on the fixed read-only storage medium.

15. A computer-readable storage medium having instructions stored therein, the instructions executable on a computer to cause the computer to perform the steps comprising:

detecting a malware infection in a first storage device volume of a computer system, wherein the malware causing the malware infection is a form of malware known to require a clean boot of the computer system for remediation of the malware;

responsive to the detection of the malware infection, a security module of the computer system automatically modifying a basic input/output system (BIOS) boot sequence of the computer system to designate a second storage device volume to be a primary boot device for the computer system, causing the computer system to automatically boot from the second storage device volume of the computer system at a next reboot of the computer system;

executing update software stored in the first storage device volume;

updating, by execution of the update software, security software stored in the second storage device volume, the second storage device volume being a fixed read-only volume; and remediating the malware infection using the updated security software stored in the second storage device volume.

16. The computer-readable storage medium of claim 15, further comprising:

verifying access to a basic input/output system (BIOS) setting; and based on the verification, modifying the BIOS setting to designate the second storage device volume as a primary boot device.

17. The computer-readable storage medium of claim 15, further comprising causing the computer system to boot from the second storage device volume after a predetermined number of boots from the first storage device volume.

18. The computer-readable storage medium of claim 15, further comprising:

loading bootstrap code to allow for validation of security software stored in the first storage device volume; and executing the security software stored in the first storage device volume to remediate the malware infection.

19. The computer-readable storage medium of claim 15, further comprising:

executing update software stored in the second storage device volume; and downloading an updated version of the security software stored in the second storage device volume based on the execution.

* * * * *